(12) United States Patent
Engelhardt (10) Patent No.: US 7,428,104 B2
(45) Date of Patent: Sep. 23, 2008

(54) OPTICAL DEVICE FOR THE COMBINATION OF LIGHT BEAMS

(75) Inventor: Johann Engelhardt, Bad Schoenborn (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 58 days.

(21) Appl. No.: 10/521,892

(22) PCT Filed: Jun. 13, 2003

(86) PCT No.: PCT/EP03/06236

§ 371 (c)(1), (2), (4) Date: Jan. 19, 2005

(87) PCT Pub. No.: WO2004/010202

PCT Pub. Date: Jan. 29, 2004

(65) Prior Publication Data

US 2005/0264875 A1    Dec. 1, 2005

(30) Foreign Application Priority Data

Jul. 19, 2002    (DE) .............................. 102 33 074

(51) Int. Cl.
*G02B 27/12* (2006.01)

(52) U.S. Cl. .................. 359/639; 359/638; 359/640; 359/831

(58) Field of Classification Search ......... 359/638–640, 359/831–837, 368
See application file for complete search history.

(56) References Cited

U.S. PATENT DOCUMENTS

| 3,743,383 | A | | 7/1973 | Giallorenzi | ................. 350/170 |
| 3,905,684 | A | * | 9/1975 | Cook et al. | ................. 359/633 |
| 4,627,725 | A | | 12/1986 | Nishio et al. | ................ 356/152 |
| 4,645,302 | A | * | 2/1987 | Aughton | ..................... 359/638 |
| 4,746,798 | A | * | 5/1988 | Amon et al. | ........... 250/339.02 |
| 5,969,851 | A | * | 10/1999 | Clark et al. | ................. 359/345 |
| 6,014,206 | A | | 1/2000 | Basting et al. | ............. 356/138 |
| 6,020,963 | A | * | 2/2000 | DiMarzio | ................... 356/491 |
| 6,248,988 | B1 | * | 6/2001 | Krantz | .................... 250/201.3 |

(Continued)

FOREIGN PATENT DOCUMENTS

DE    198 16 302    11/1999

(Continued)

OTHER PUBLICATIONS

International Search Report for International Application No. PCT/EP2003/006236.

*Primary Examiner*—Joshua L Pritchett
(74) *Attorney, Agent, or Firm*—Darby & Darby (57) ABSTRACT

An optical device for combining a first light beam and at least one second light beam includes a first beam splitting device, a second beam splitting device and a position detector. The first beam splitting device splits a first reference beam from the first light beam and a second reference beam from the second light beam. The second beam splitting device splits a third reference beam from the first light beam and a fourth reference beam from the second light beam. The position detector detects respective positions of the reference beams so as to enable a respective propagation direction and/or a respective position of the first and/or second light beams to be adjusted as a function of the detected positions of the reference beams.

18 Claims, 4 Drawing Sheets

U.S. PATENT DOCUMENTS

| | | | |
|---|---|---|---|
| 6,278,555 B1 | 8/2001 | Stock et al. | 359/634 |
| 6,535,290 B1 * | 3/2003 | Spanner et al. | 356/499 |
| 6,594,074 B1 | 7/2003 | Wolleschensky et al. | 359/385 |
| 2002/0171843 A1 * | 11/2002 | Frankel | 356/491 |

FOREIGN PATENT DOCUMENTS

| | | |
|---|---|---|
| DE | 198 29 953 | 1/2000 |
| DE | 198 35 068 | 2/2000 |
| DE | 199 42 905 | 3/2000 |
| EP | 1 202 102 | 5/2002 |

* cited by examiner

OPTICAL DEVICE FOR THE COMBINATION OF LIGHT BEAMS

The present invention relates to an optical device for combining a light beam and at least one further light beam.

BACKGROUND

In optics, a frequently occurring problem is to collinearly combine light beams, in particular light beams of different wavelengths.

For example, in scanning microscopy, samples are often prepared with a plurality of markers, for example, a plurality of different fluorescent dyes, to simultaneously excite them with an illuminating light beam containing light of several excitation wavelengths. To produce the illuminating light beam, usually, the light beams of several lasers are combined using usually a plurality of dichroic beam splitters arranged in series. A scanning microscope having a dichroic beam combiner for infrared and ultraviolet light is known, for example, from German Published Patent Application DE 198 29 953 A1.

German Published Patent Application DE 198 35 068 A1 discloses a microscope, in particular a laser scanning microscope, with illumination over one wavelength and/or a plurality of wavelengths, where the intensity of at least one wavelength is controlled by at least one rotatable interference filter placed in the illuminating beam path, and where the at least one wavelength is at least partially reflected out of the illuminating beam path, and a plurality of filters for different wavelengths can be arranged in series in the illuminating beam path.

In scanning microscopy, the light beams of a light source are coupled into the scanning microscope and aligned to the optical path of the scanning microscope, and a sample is illuminated by the light beam to observe the reflected or fluorescent light emitted by the sample. The focus of an illuminating light beam is moved in a sample plane using a controllable beam deflection device, generally by tilting two mirrors; the deflection axes usually being perpendicular to one another so that one mirror deflects in the X direction and the other in the Y direction. Tilting of the mirrors is brought about, for example, by galvanometer positioning elements. The power of the light coming from the sample is measured as a function of the position of the scanning beam. The positioning elements are usually equipped with sensors to determine the current mirror position.

In confocal scanning microscopy specifically, a sample is scanned in three dimensions with the focus of a light beam.

A confocal scanning microscope generally includes a light source, a focusing optical system with which the light of the source is focused onto a pinhole (called the "excitation pinhole"), a beam splitter, a beam deflection device for beam control, a microscope optical system, a detection pinhole, and the detectors for detecting the detection or fluorescent light. The illuminating light is coupled in via a beam splitter. The fluorescent or reflected light coming from the sample travels back through the beam deflection device to the beam splitter, passes through it, and is then focused onto the detection pinhole behind which the detectors are located. Detection light that does not derive directly from the focus region takes a different light path and does not pass through the detection pinhole, so that point information is obtained which leads to a three-dimensional image by sequential scanning of the sample. A three-dimensional image is usually achieved by acquiring image data in layers; the track of the scanning light beam on or in the sample ideally describing a meander (scanning one line in the X direction at a constant Y position, then stopping the X scan and stewing by Y displacement to the next line to be scanned, then scanning that line in the negative X direction at a constant Y position, etc.). To allow the acquisition of image data in layers, the sample stage or the objective is shifted after a layer has been scanned, and the next layer to be scanned is thus brought into the focal plane of the objective.

The input coupling of the light beams for illuminating a sample into a microscope is very critical with respect to alignment, especially because the position and propagation direction of usually a plurality of light beams of different wavelengths must exactly follow the nominal optical path of the microscope. Alignment of a direct input coupling is first of all difficult, and secondly is usually not very reliable because, due to relatively long light paths, even the smallest variations in the setup lead to imperfections requiring painstaking realignment. Frequently, optical fibers are used to transport the light beams from the light source or light sources to the microscope in order to reduce the problem to an alignment of the output coupling of the optical fiber, which is in fact also painstaking, but, due to the shorter light paths, is less sensitive to misalignments. This does not solve, but at best reduce the alignment problem, and involves other difficulties, such as the variation in the polarization direction of the light beams.

The known systems for combining light beams of different wavelengths have the disadvantage of being inflexible with respect to a change in wavelength. Moreover, it is not possible to ascertain whether the combined beams actually propagate exactly collinearly. This effort is generally left to the user or to the service technician. If the light beams combined into an illuminating light beam are not substantially collinear, then abberations, in particular artifacts and variations in brightness, will occur in scanning microscopy.

SUMMARY OF THE INVENTION

It is the an object of the present invention to provide an optical device for combining a light beam and at least one further light beam which can be used flexibly, in particular for different wavelengths, and which at the same time allows efficient and effective monitoring of the combining of light beams.

The present invention provides an optical device that features a means for splitting a first reference beam from the light beam and a further first reference beam from the further light beam, as well as a further means for splitting a second reference beam from the light beam and a further second reference beam from the further light beam; the reference beams being detectable by a position detector, and the propagation direction and/or the position of the light beam and/or of the further light beam being adjustable as a function of the detected positions.

Especially in scanning microscopy, the present invention has the advantage of allowing the light beams of a light source or a plurality of light sources to be aligned to the nominal optical path in a simple and reliable manner. Also provided is an effective way of monitoring the alignment. In scanning microscopy, therefore, particularly stable image quality is achieved by the avoidance of misalignments, while flexible use is possible in terms of the illuminating light wavelength.

In a preferred embodiment, the means for splitting off a first reference beam is a first interface, and the further means for splitting off the second reference beam is a second interface. In one preferred embodiment, provision is made for a prism in which two of the lateral faces form the first and second interfaces.

In another variant, an acousto-optical element is provided which can, for example, take the form of an acousto-optical modulator (AOM), an acousto-optical tunable filter (AOTF), or an acousto-optical deflector (AOD). In one preferred embodiment, the acousto-optical element can bring about the combination of the light beams. In another embodiment, the acousto-optical element is used for spectral separation and, for example, is arranged upstream of a prism having a first and a second interface. The acousto-optical element can also be used to separately vary the optical power of the combined light beams and adapt it to the particular use.

In a preferred embodiment, the position detector is calibrated for different detectable positions. Each possible beam position is preferably assigned a detectable set of positions; a corresponding set of nominal positions also existing for the nominal beam position. The propagation direction and/or the position of the light beams to be aligned are optimized until the nominal positions are detected. If the detected positions deviate from the nominal positions, for example, because of an external disturbance, a realignment can be carried out by a control loop, so that the light beams to be aligned can be actively kept on the nominal optical path. Preferably, the first reference beam and the second reference beam are split off at different locations.

In one preferred embodiment, the means for splitting off a first reference beam and the further means for splitting off the second reference beam are parts of a single optical component, for example, two lateral faces of a prism. This embodiment is particularly stable and resistant to vibrations and shocks. The equipment or device according to the present invention preferably has a compact monolithic design. Preferably, the splitting means and the position detector are arranged in a fixed spatial relationship to each other, which provides exceptional stability because only a relative measurement needs to be performed.

In one particular embodiment, the propagation direction and/or the position of the light beam or beams can be changed by control elements, which can, for example, take the form of gimbal-mounted tilting mirrors. In a preferred variant, it is proposed that the angles of incidence and/or the locations at which the light beams strike the first interface be adjustable. Control elements are provided for this purpose as well. Possible control elements include all adjustable and preferably controllable light beam deflecting elements, for example, also acousto-optical deflectors (AOD). The control elements are preferably placed upstream of the means for splitting off a first reference beam.

Advantageous is an embodiment in which the control elements can be driven in open and/or closed loop as a function of the positions detected by the position detector(s). Such a design allows implementation of a closed-loop or open-loop control which automatically optimizes the alignment of the light beam (light beams) and the collinearly of the combined light beams.

In a preferred embodiment, the position detector is designed as a CCD detector. It may also be designed as a photodiode line array, as a photomultiplier array, or may also include a plurality of single detectors. Preferably, the reference beams are detected together by one position detector, so that only relative measurements within the position detector are required.

The position of the first reference beam and the position of the second reference beam are preferably detected independently of each other and made available for correcting the beam angles and positions. In a preferred embodiment, the positions of the reference beams are detected simultaneously, which is particularly advantageous in terms of external disturbances, such as vibrations and shocks, because the measurement is not corrupted by spatial changes.

In one particular embodiment, the optical powers of the reference beams can be determined independently of each other and used for correcting the optical powers, which is important especially in scanning microscopy.

In a preferred embodiment of the alignment device, at least one further light beam can be aligned to the nominal optical path. The light beam and further light beams can have different wavelengths.

In one preferred embodiment, a component for spectral separation is provided upstream of the means for splitting off a first reference beam, preferably between the control elements and the means for splitting off a first reference beam. The component for spectral separation can, for example, take the form of a plane-parallel plate, prism or grating.

In a different embodiment, a dispersive element is provided between the means for splitting off a first reference beam and the further means for splitting off the second reference beam.

In a preferred embodiment of the alignment device, the splitting means splits a further first reference beam from the further light beam, the further splitting means splits a further second reference beam from the further light beam; the further first and the further second reference beam being detectable by the position detector, and the propagation direction and/or the position of the second light beam being alignable to the nominal optical path as a function of the detected positions of the further first and the further second reference beam. Preferably, the propagation direction and/or the position of the first and the further light beam can be adjusted independently of each other. In one variant, further control elements are provided for adjusting the propagation direction and/or the position of the further light beam. Preferably, the further control elements can be driven as a function of the detected positions of the further first and the further second reference beam.

The alignment device is particularly suitable for coupling light beams into a microscope, in particular a scanning microscope, which can be designed as a confocal scanning microscope. Accordingly, the nominal optical path can be the optical path of a microscope, scanning microscope, or confocal scanning microscope. In another advantageous embodiment, the device serves at the same time for coupling out the detection light emanating from the sample.

In one preferred embodiment, the light beams emitted by the light source initially propagate collinearly and are separated both spatially and spectrally by a component for spectral separation upstream of the first interface. This embodiment is of interest, especially if the light source includes an optical fiber that transports all primary light beams together.

BRIEF DESCRIPTION OF THE DRAWINGS

The subject matter of the present invention is schematically represented in the drawings and is described below with reference thereto. In the drawings, equally acting components are denoted by the same reference numerals. Specifically.

DETAILED DESCRIPTION

Figure 1:
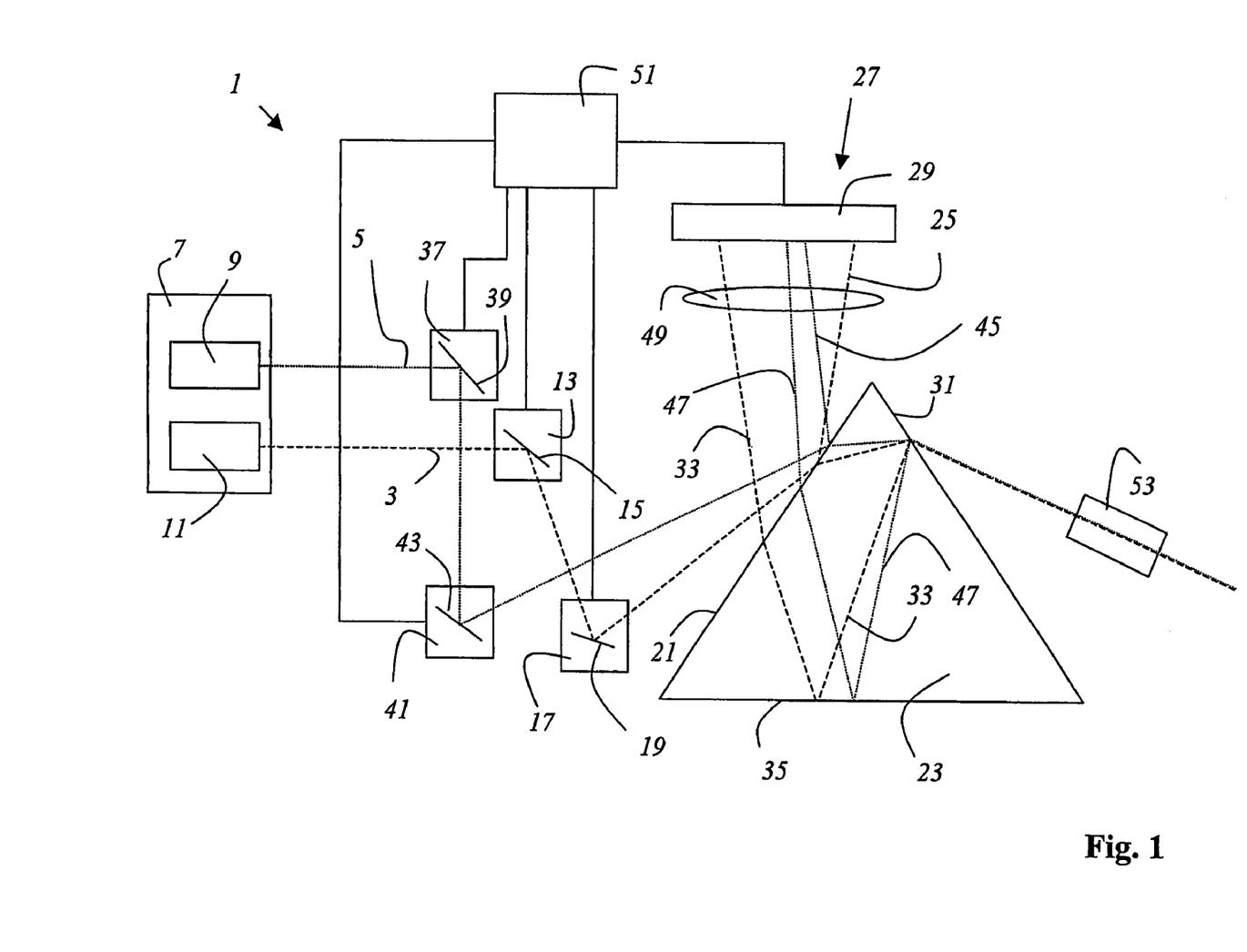
FIG. 1 shows an optical device for combining at least two light beams.

FIG. 1 schematically shows an optical device 1 for combining at least two light beams, namely a first light beam 3 and a second light beam 5. Light beams 3, 5 are emitted by a light source 7 including a first laser 9 and a second laser 11. Light beams 3, 5 have different wavelengths. First light beam 3 strikes a first control element 13 including a first titling mirror 15 which can be tilted in two axes. Subsequently, first light beam 3 strikes a second control element 17 including a second titling mirror 19 which can be tilted in two axes. Second control element 17 directs first light beam 3 to a means for splitting off a first reference beam 25; the means being designed as a first interface 21 of a prism 23. At first interface 21, a first reference beam 25 is split off by partial reflection and strikes position detector 27, which is designed as a CCD array 29. After passing through first interface 21, first light beam 3 passes through prism 23 and strikes a further means for splitting off a second reference beam 33; the further means being designed as a second interface 31. At second interface 31, a second reference beam 33 is split off by partial reflection and, after total internal reflection at a third interface 35 and passage through first interface 21, it strikes position detector 27. Analogously, the path of second light beam 5 is controlled by a third control element 37 including a third tilting mirror 39 and a fourth control element 41 including a fourth tilting mirror 43. A further first reference beam 45 is split off from second light beam 5 at first interface 21, and a further second reference beam 47 is split off at second interface 31, the further first and second reference beams being directed to position detector 27. Located in front of the position detector is a lens 49, which focuses the reference beams onto CCD array 29. It is also possible to provide for a slight defocus in order to achieve a better resolution by interpolation across several pixels. From the various points of incidence of the reference beams on CCD array 29 it is possible to infer the locations and angles at which light beams 3, 5 strike first interface 21 and second interface 31, and thus the position and propagation direction of light beams 3, 5 after exiting prism 23. The position detector generates position signals and transmits them to a processing unit 51. Based on the position data received, processing unit 51 drives control elements 13, 17, 37, 41 until the light beams 3, 5 exiting the prism are sufficiently collinear. The path difference between first reference beam 25 and second reference beam 33, and between further first reference beam 45 and further second reference beam 47, respectively, is preferably about 20 mm, which results in a change in distance of about 20 μm on the position detector per mrad of angular difference. 20 μm corresponds approximately to the distance between two pixels on conventional CCD detectors.

In the subsequent path of combined light beams 3, 5, provision is made for an acousto-optical element in the form of an AOTF 53 to allow the optical power of light beams 3, 5 to be adjusted separately. First light beam 3 and the reference beams 25, 33 split off therefrom are shown as dashed lines in the drawing. Second light beam 5 and the reference beams 45, 47 split off therefrom are shown as dotted lines in the drawing.

Figure 2:
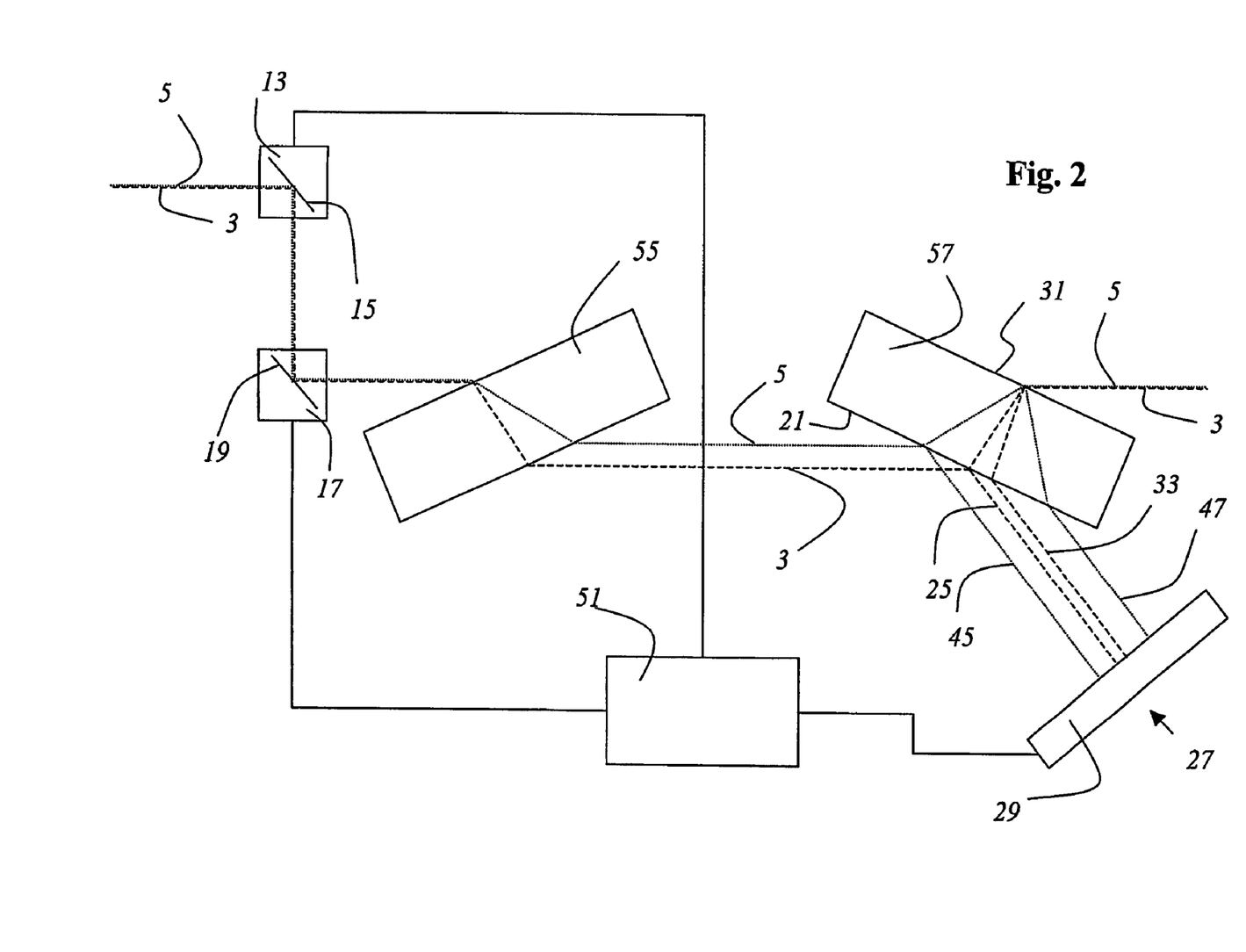
FIG. 2 depicts an alignment device.

FIG. 2 shows a device according to the present invention which is particularly suitable for aligning a plurality of coaxial light beams 3, 5 having different wavelengths to a common nominal optical path, for example, after they are coupled out of an optical fiber, and to keep them on the common path through suitable control.

Light beams 3, 5 strike a first control element 13 including a first titling mirror 15 which can be tilted in two axes and then a second control element 17 including a second titling mirror 19 which can be tilted in two axes. Using control elements 13, 17, it is possible to adjust the position and propagation direction of light beams 3, 5. After passing control elements 13, 17, light beams 3, 5 strike a first plane-parallel plate 55, which separates light beams 3, 5 both spectrally and spatially. Light beams 3, 5 are recombined by a second plane-parallel plate 57. As a means for splitting off a first reference beam 25 and a further first reference beam 45, second plane-parallel plate 57 has a first interface 21 which splits a first reference beam 25 from first light beam 3, and a further first reference beam 45 from second light beam 5. After passing through second plane-parallel plate 57, light beams 3, 5 strike a means for splitting off a second reference beam 33 and a further second reference beam 47, namely a second interface 31 which splits a second reference beam 33 from first light beam 3, and a further second reference beam 47 from second light beam 5. All reference beams are directed onto a position detector 27, which is designed as a CCD array 29.

The position detector 27 generates position signals and transmits them to a processing unit 51. Based on the position data received, processing unit 51 drives control elements 13, 17 until the light beams 3, 5 exiting the second plane-parallel plate are in the desired position and propagate in the desired direction. The current position and propagation direction of light beams 3, 5 are permanently or regularly compared to the desired position and propagation direction and, if necessary, automatically corrected by processing unit 51 via control elements 13, 17.

Figure 3:
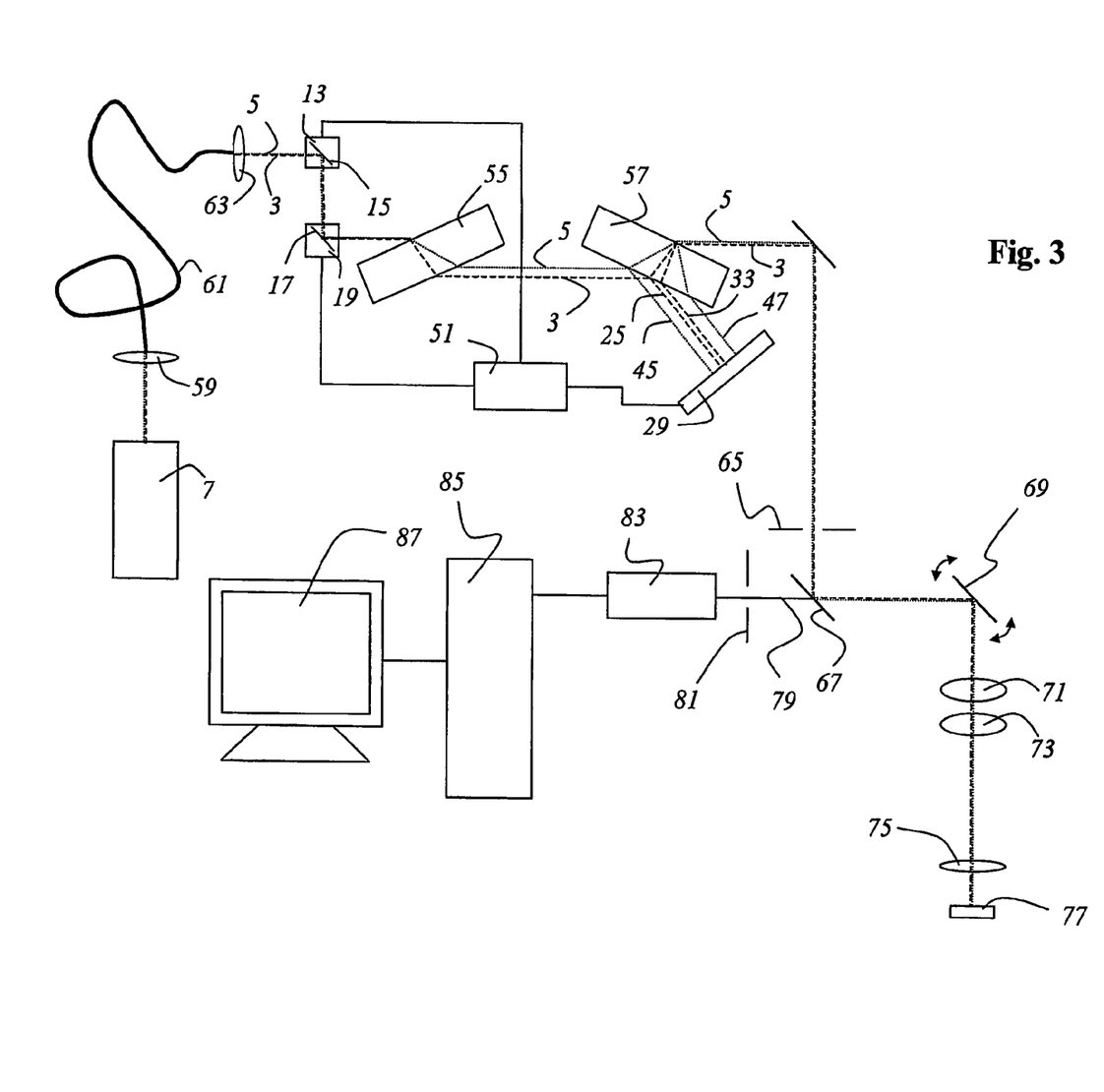
FIG. 3 shows a scanning microscope according to the present invention.

FIG. 3 is a schematic view of a scanning microscope which is designed as a confocal scanning microscope. Light beams 3, 5 coming from a light source 7 in the form of a multiline laser are coupled by an optical system 59 into an optical fiber 61 for transport. Output coupling is via a further optical system 63 which substantially collimates light beams 3, 5. The device below, whose mode of operation has already been described with reference to FIG. 2, automatically aligns light beams 3, 5 to the optical path of the scanning microscope.

After passing through illuminating pinhole 65, light beams 3, 5 are directed by a beam splitter 67 to a gimbal-mounted scanning mirror 69 which guides light beams 3, 5 through scanning optical system 71, tube optical system 73 and objective 75, and over or through sample 77. Sample 77 is labeled with several fluorescent dyes. The detection light beam 79 emanating from sample 77 passes through objective 75, tube optical system 73, and scanning optical system 71, and reaches beam splitter 67 via scanning mirror 69, and, after passing through detection pinhole 81, it strikes a detector 83 which designed as a multiband detector and generates electrical detection signals which are proportional to the power of detection light beam 79. These signals are transmitted to PC 85. The detection signals are processed in PC 85 and displayed to the user on a monitor 87 as an image of sample 77. The scanning microscope is insensitive to misalignments and allows quick and easy replacement of the light source or the optical fiber.

Figure 4:
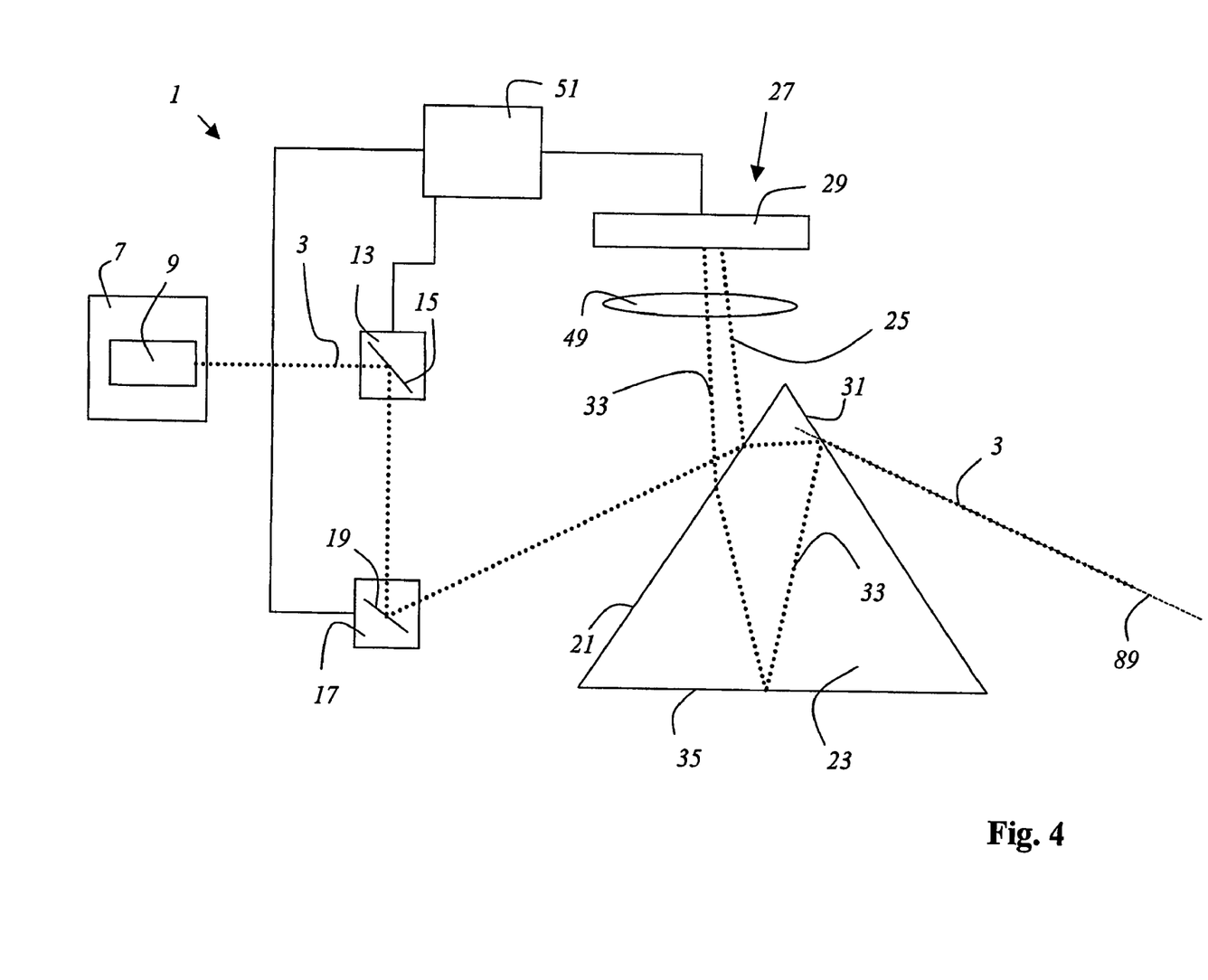
FIG. 4 illustrates a further alignment device.

FIG. 4 shows a device for aligning a light beam 3 to a nominal optical path, which is illustrated in the drawing as a nominal optical axis 89. Light beam 3 strikes a first control element 13 including a first titling mirror 15 which can be tilted in two axes. Subsequently, first light beam 3 strikes a second control element 17 including a second titling mirror 19 which can be tilted in two axes. Second control element 17 directs first light beam 3 to a means for splitting off a first reference beam 25, the means being designed as a first interface 21 of a prism 23. At first interface 21, a first reference beam 25 is split off by partial reflection and strikes position detector 27, which is designed as a CCD array 29. After passing through first interface 21, first light beam 3 passes through prism 23 and strikes a further means for splitting off a second reference beam 33, the further means being designed as a second interface 31. At second interface 31, a second reference beam 33 is split off by partial reflection and, after total internal reflection at a third interface 35 and passage through first interface 21, it strikes position detector 27. Located in front of the position detector is a lens 49, which focuses the reference beams onto CCD array 29. It is also possible to provide for a slight defocus in order to achieve a better resolution by interpolation across several pixels. From the various points of incidence of the reference beams on CCD array 29 it is possible to infer the locations and angles at which light beam 3 strikes first interface 21 and second interface 31, and thus the position and propagation direction of light beam 3 after exiting prism 23. The position detector generates position signals and transmits them to a processing unit 51. Based on the position data received, processing unit 51 drives control elements 13, 17 until the light beam 3 exiting the prism propagates along the nominal optical path, i.e. along nominal axis 89.

The same device can be used to simultaneously align further light beams to the nominal optical path. Preferably, further control elements are provided for that purpose.

The present invention has been explained with reference to a specific embodiment. However, changes and modifications can of course be made without exceeding the scope of the following claims.

LIST OF REFERENCE NUMERALS 1 optical device
3 first light beam
5 second light beam
7 light source
9 first laser
11 second laser
13 first control element
15 first tilting mirror
17 second control element
19 second tilting mirror
21 first interface
23 prisms
25 first reference beam
27 position detector
29 CCD array
31 second interface
33 second reference beam
35 third interface
37 third control element
39 third tilting mirror
41 fourth control element
43 fourth tilting mirror
45 further first reference beam
47 further second reference beam
49 lens
51 processing unit
53 AOTF
55 first plane-parallel plate
57 second plane-parallel plate
59 optical system
61 optical fiber
63 further optical system
65 illuminating pinhole
67 beam splitter
69 scanning mirror
71 scanning optical system
73 tube optical system
75 objective
77 sample
79 detection light beam
81 detection pinhole
83 detector
85 PC
87 monitor
89 nominal axis

What is claimed is:

1. An optical device for collinearly combining, for illumination in scanning microscopy, a first light beam and a second light beam having a different wavelength than the first light beam, the optical device comprising:
   a first dispersive element configured to split a first reference beam from the first light beam and a second reference beam from the second light beam;
   a second dispersive element configured to split a third reference beam from the first light beam and a fourth reference beam from the second light beam;
   a position detector configured to detect respective positions of the reference beams; and
   a control element configured to independently adjust, as a function of the detected respective positions of the first and third reference beams and second and fourth reference beams, at least one of a propagation direction of the first light beam, a propagation direction of the second light beam, a position of the first light beam, and a position of the second light beam.

2. The optical device as recited in claim 1 wherein the first dispersive element includes a first interface, and the second dispersive element includes a second interface.

3. The optical device as recited in claim 2 wherein the control element is configured to adjust an angle of incidence of the first light beam on the first interface.

4. The optical device as recited in claim 2 wherein the control element is configured to adjust a striking location of the first beam on the first interface.

5. The optical device as recited in claim 1 wherein the dispersive element includes at least one of a prism, a grating, and an acousto-optical element.

6. The optical device as recited in claim 1 wherein the first and second dispersive elements are parts of a same optical component.

7. The optical device as recited in claim 6 wherein the same optical component is a prism.

8. The optical device as recited in claim 1 wherein the control element includes a tilting mirror.

9. The optical device as recited in claim 1 wherein the control element is disposed upstream of the first beam splitting device.

10. The optical device as recited in claim 1 wherein the position detector includes a CCD detector.

11. The optical device as recited in claim 1 wherein the position detector includes a first detector configured to detect the respective position of each of the reference beams.

12. The optical deice as recited in claim 1 wherein the position detector is configured to simultaneously detect the reference beams.

13. The optical device as recited in claim 1 wherein the position detector is configured to be calibrated for different respective detectable positions of the reference beams.

14. A method for combining first and second light beams having different wave lengths, the method comprising:
   splitting a first reference beam from the first light beam using a first dispersive element;

splitting a second reference beam from the second light beam using the first dispersive element; splitting a third reference beam from the first light beam using a second dispersive element;

splitting a fourth reference beam from the second light beam using the second dispersive element;

detecting respective positions of the reference beams using a position detector;

adjusting a propagation direction of the first light beam as a function of the detected respective positions of the first and third reference beams; and independently adjusting a propagation direction of the second light beam as a function of the detected respective positions of the second and fourth reference beams.

15. The method recited in claim 14 wherein the first dispersive element and second dispersive element are part of a single prism.

16. The method recited in claim 14 wherein adjusting the propagation direction of the first light beam is carried out using a tilting mirror.

17. The method recited in claim 14 wherein adjusting the propagation direction of the first light beam adjusts a striking location of the first light beam on the first dispersive element.

18. The method recited in claim 17 wherein adjusting the propagation direction of the second light beam adjusts a striking location of the second light beam on the first dispersive element.

* * * * *